Patented May 19, 1925.

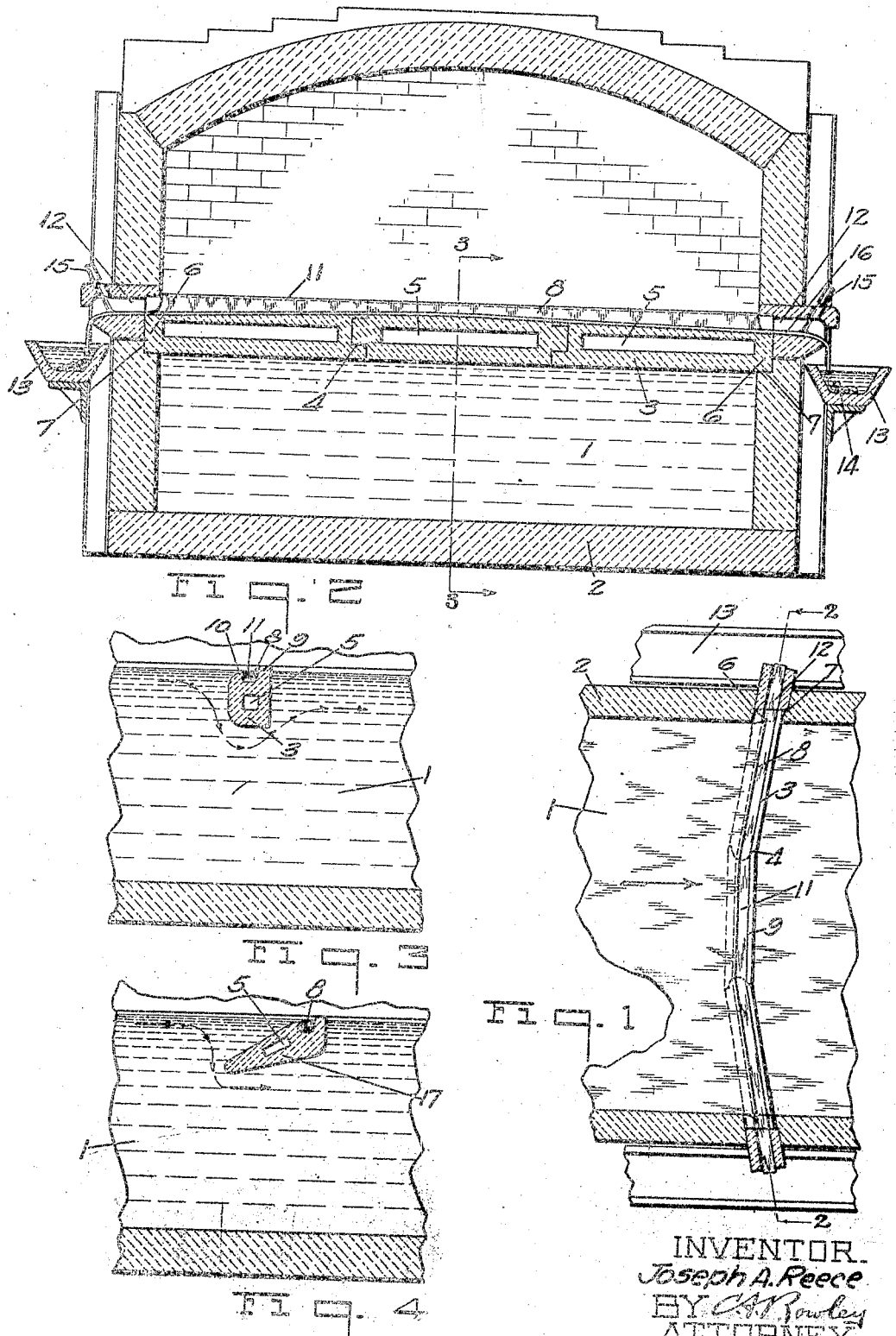

1,538,215

UNITED STATES PATENT OFFICE.

JOSEPH A. REECE, OF TOLEDO, OHIO, ASSIGNOR TO THE LIBBEY-OWENS SHEET GLASS COMPANY, OF TOLEDO, OHIO, A CORPORATION OF OHIO.

GLASS FURNACE.

Application filed April 7, 1924. Serial No. 704,615.

*To all whom it may concern:*

Be it known that I, JOSEPH A. REECE, a citizen of the United States, residing at Toledo, in the county of Lucas and State of Ohio, have invented new and useful Improvements in Glass Furnaces, of which the following is a specification.

This invention relates to improvements in tank furnaces, and more particularly to an improved type of automatic skimming device for use in such a furnace.

In continuous tank furnaces, through which molten glass flows from the melting end through the refining portion of the tank to the glass-working machine, it is often customary to place a refractory floater transversely of the tank in the surface glass. This floater will have sufficient buoyancy to float practically submerged within the molten glass but with its upper edge extending above the glass level to prevent the flow of any surface glass past this refractory dam. The glass which passes from one side of the floater to the other must flow down beneath the refractory member. This serves to hold back the surface glass which may have dirt or other impurities floating on its upper surface, and also enforces a deeper flow of the glass through the tank since all glass reaching the down-stream of the floater must pass downwardly beneath the lowermost portion of the floater. It is also customary to rake out through openings in the tank sides, by means of suitable skimming tools, the dirt or other impurities or devitrified glass that may accumulate back of the floater.

According to the present invention, a partition or floater is secured in place transversely of the flowing glass stream and partially submerged therein. This member is provided with a drainage trough or channel in its upper face into which a thin stream of the surface flow may spill over the up-stream side of the trough, which, when in operating position will be submerged slightly below the normal glass level. The trough or channel slopes so that the surface glass which spills into this channel will be drained off toward either or both side walls of the tank where it discharges through suitable passages into tanks of water outside of the furnace wherein it is converted to cullet. In this way the dam member serves the usual function of a floater by enforcing a deeper flow of the glass, and at the same time acts as an automatic skimming device for removing the extreme upper surface glass which carries most of the impurities. At the same time this overflow feature tends to maintain a constant glass level in the tank, and the glass which flows out through the tank sides provides a supply of cullet which is an essential ingredient of the proper mixture for making molten glass.

The objects and advantages of the invention will be better understood from the following detailed description of one approved type of the apparatus.

In the accompanying drawings:

Fig. 1 is a horizontal section, taken slightly above the glass level, through a portion of the furnace, showing the improved floater and skimming device in place.

Fig. 2 is a transverse vertical section through the furnace and floater, taken substantially on the line 2—2 of Fig. 1.

Fig. 3 is a longitudinal vertical section taken substantially on the line 3—3 of Fig. 2.

Fig. 4 is a view similar to Fig. 3 of a modified form of skimmer.

The molten glass 1 flows slowly through the tank 2 in the direction of the arrow Fig. 1. The improved dam or floater 3, which may be located transversely of the tank at any suitable point in its length, may be formed of a plurality of sections having interlocking joints as indicated at 4. These sections will be made of a suitable refractory material, such as fire-clay, and their weight will be so adjusted by providing suitably positioned and proportioned air-spaces 5 therein, that the sections will normally tend to float, submerged to the desired depth, in the molten glass. However, the dam is supported and held in fixed position by having its ends 6 inserted in suitable recesses 7 in the side walls of the tank. In this way, although the greater portion of its weight is supported by the buoyant effect of the molten glass in which the largest portion of its bulk is submerged, the floater does not rise or fall with small changes in glass level in the tank, but remains substantially fixed in position, and partially supported from the side walls of the tank. By having the central portion of the floater arched slightly in an up-stream direction, the flowing pressure of the glass will hold the floater sections in place.

In its upper portion the floater is provided with a longitudinally extending trough or channel 8, one wall 9 of which normally extends above the glass level, whereas the other wall 10, on the up-stream side, will normally be submerged slightly below the glass level so that a thin stream of the surface glass as at 11 will constantly spill over this wall 10 into the channel 8. The channel 8 is shallower at the central portion of the floater and deeper at the ends of the floater so that the glass which spills into the channel will flow toward either side of the tank.

The ends of the channel 8 are in open communication with discharge passages 12 leading through the respective side walls of the tank. The glass which flows out through these passages 12 discharges into suitable troughs or tanks 13 positioned outside of the furnace and partially filled with water so that the molten stream will be converted into cullet as indicated at 14 in Fig. 2. Burners 15 are positioned to play upon the molten streams 16 in passages 12 to maintain the streams at a proper flowing temperature.

The lower portion of the floater 3 may be given many different cross-sectional forms than that disclosed in Figs. 1 to 3, a form being indicated at 17 in Fig. 4 which will enforce a deeper flow of glass beneath the floater and at the same time divert a larger proportion of the surface glass into the drainage trough 8.

An installation of this type not only performs the customary function of a floater, in enforcing a lower flow of glass in the tank and holding back the stream surface portion, but also acts as an automatic skimming device for removing that portion of the surface flow containing the greatest percentage of dirt and impurities. At the same time it will tend to maintain a more constant glass level in the tank due to its ability to withdraw varying amounts of glass through the overflow passages. The molten glass which flows out into the tanks 13 and is converted into cullet 14 is not wasted since the good portion of this glass may be used again, cullet being an essential material in the mixture which is melted to produce the molten glass.

Claims:

1. The process of skimming the surface glass in a continuous tank furnace, consisting in obstructing the flow of the upper glass strata, separating the upper surface glass from the main body of flowing glass, flowing this glass transversely from the tank, and converting it into cullet.

2. The process of skimming the surface glass in a continuous tank furnace, consisting in obstructing the flow of the upper glass strata, collecting the surface glass into transverse flows directed through the sides of the tank, and forming cullet from these transverse flows.

3. The process of skimming the surface glass in a continuous tank furnace, consisting in obstructing the flow of the upper glass strata, collecting the surface glass into transverse flows directed through the sides of the tank, applying heat to the transverse flows to insure a free flow of this surface glass, and forming cullet of the glass flowing through the sides of the tank.

4. A refractory floater for use in a glass tank, comprising a main glass obstructing portion, and a glass collecting trough in the top of the floater, one side wall of the trough being normally slightly below the glass level so that surface glass may flow into the trough.

5. A refractory floater for use in a glass tank, comprising a main glass obstructing portion, and a glass collecting trough in the top of the floater, one side wall of the trough being normally slightly below the glass level so that surface glass may flow into the trough, the bottom of the trough sloping toward the two ends of the float.

6. Means for skimming the surface glass in a continuous tank furnace, comprising a refractory floater extending across the tank in the path of the surface glass, a collecting channel in the float into which the surface glass may spill, and an outlet port in the side of the tank through which the channel discharges.

7. Means for skimming the surface glass in a continuous tank furnace, comprising a refractory floater extending across the tank in the path of the surface glass, a collecting channel in the float into which the surface glass may spill, and outlet ports in the sides of the tank through which the channel discharges.

8. Means for skimming the surface glass in a continuous tank furnace, comprising a refractory floater extending across the tank in the path of the surface glass, a collecting channel in the float into which the surface glass may spill, outlet ports in the sides of the tank through which the channel discharges, and means for heating the glass in the outlet ports.

Signed at Toledo, in the county of Lucas, and State of Ohio, this 5th day of April, 1924.

JOSEPH A. REECE.